Patented Jan. 16, 1934

1,944,065

UNITED STATES PATENT OFFICE 1,944,065

LOW VOLTAGE STORAGE BATTERY

Rufus N. Chamberlain, Chicago, Ill., assignor, by mesne assignments, to Gould Storage Battery Corporation, Depew, N. Y., a corporation of Delaware No Drawing. Application March 7, 1930
Serial No. 434,170

1 Claim. (Cl. 136—26)

The invention relates to storage batteries and has special reference to the material utilized in making plates of the pasted type.

The charging voltage at the end of a full charge or over charge of a storage battery especially with the modern auto starting batteries is so high that the electric lamps, spark plugs, spark coils and electric generator all suffer more or less as they are usually designed and built to operate at lower voltages corresponding to the floating or discharge voltage of the batteries i. e. about 6 to 7 volts. It is not uncommon to find three cell six volt batteries showing an end charge voltage, especially in cool or cold weather, of over eight volts per battery, i. e. over 2.7 volts per cell and in some instances even over 2.8 volts per cell. Not only is such high end charge voltage injurious to the electrical apparatus on the motor car but the efficiency of the battery is lowered. A lower end charge voltage would also be beneficial in telephone and other service where storage batteries are used.

The object of this invention, generally stated, is to provide a paste material or combination of materials which will reduce the required end charging voltage for storage batteries of the lead-acid-lead type, the invention involving, more specifically, the use of suitable special ingredients within the cells.

In regard particularly to negative plates I have found that by the addition or use of suitable chemicals or materials either (a) in the active material or material adapted to become active or (b) in the electrolyte or (c) by surface application on the negative plate-mechanically, chemically or electro-chemically or (d) adding material by any other suitable means I can produce the desired result without injuriously affecting the operation especially of auto starting batteries.

In my application of the above invention I have demonstrated a lowering or difference of 0.18 to 0.20 volts per cell between cells not having the special ingredient and those with the ingredient or chemical. For instance in a three cell auto starting battery a regular or standard cell with no low end charge voltage ingredient showed an end charge voltage of 2.69 volts while the two other cells having the low end charge voltage ingredient showed end charge voltage of 2.48 volts and 2.50 volts or a difference of 0.19 to 0.21 volts per cell. This data was obtained by the end charge reading being taken on the 15th recharge following 14 previous charges and discharges in order to have a fair operating condition. The 3 cells being in the same auto starting battery were all of substantially the same temperature, namely about 72° F.

Some of the chemicals or ingredients I have used are powdered antimony or suitable compounds of antimony such as antimony sulphate or sulphide; nickelous or cobaltous sulphate; calcium sulphate and other suitable metallic sulphates or compounds for instance of magnesium, aluminum and allied substances.

One application of my invention is to take powdered antimony or powdered antimony sulphide or sulphate and add it to the paste mixture while the same is being prepared as it can thus be readily and economically added. The same may be done with nickelous sulphate in powdered form, or the nickelous sulphate may be dissolved and the solution added to the paste mixture being prepared. Other methods of applying the ingredients can be used as for instance the nickelous sulphate may be added to the electrolyte in the cells and then the nickel or nickelous compound be precipitated by electro-chemical deposition on the negatives. Another application could be by sprinkling or powdering the surface of the negatives with powdered antimony, etc. It is obvious that any method that adds the suitable ingredients to the negative plates directly or indirectly at once or in a relatively short time will answer.

As a further demonstration of the effectiveness of this invention I made some negative paste material, from which I separated enough to make a few special negative plates. To this separated paste material I added some powdered antimony. Then these negative plates were formed and developed in series with the negative plates made from the paste from which I had separated the paste for the special negatives. From the beginning of the cycles of charge and discharge the negatives with the added ingredient showed 0.18 volts less end charge voltage and this difference has been substantially constant for over 75 cycles of charge and discharge with every indication of continuing so for the life of the negative plates. The two lots of negatives were as identical in every respect as it was commercially possible to make them, except that the few had the antimony powder ingredient added to the paste from which they were pasted and the others had no antimony ingredient.

In considering the action it is well to remember that polarization is a phenomenon which occurs on the passage of current between two electrodes immersed in an electrolyte and that it is often referred to as counter E. M. F. effect. The most important of all polarizing agents liberated is hydrogen. Being electro-positive it travels to the negative electrode and sets up an E. M. F. in opposition to the impressed E. M. F. The ingredients I add to the negative plates or to the electrolyte to act at the negative plates probably enable the hydrogen to escape more readily from the surface during formation, at the end of a charge. Whether or not this be the true reason is difficult to determine but the fact remains that the counter E. M. F. is reduced by or through the use of suitable ingredients according to my invention.

The exact determination of the proportion of whichever ingredient is used as compared with the active material is a matter which would consume considerable time owing to the necessity for experimentation through a long series of cycles of charge and discharge. However, from the data available at the present time I have found that based on weight, the proportion of the added ingredient to the active material in negative plates may vary from .9 to 1.5% for antimony, nickel, magnesium, aluminum and similar compounds, and that for calcium and similar compounds the percentage may range as high as 5%.

The action has been most beneficial in connection with negative plates. However, there is also an advantageous effect upon the positive plates. It is believed from the foregoing that the utility and benefits will be readily apparent to one skilled in the art without further explanation.

While I have described numerous specific ingredients which may be added to the active material to bring about the desired result, it should be understood that the disclosure is merely illustrative of possibilities as it is conceivable that there may be still other substances which will bring about the same result and I therefore reserve the right to make all such changes, variations and modifications, including the combining of more than one ingredient for the purpose, provided such changes constitute no departure from the spirit of the invention or the scope of the claim hereunto appended.

Having thus described the invention, I claim:

A storage battery plate of the pasted lead type adapted for use in a sulphuric acid electrolyte having active material incorporating between .9 and 1.5% by weight of nickelous sulphate.

RUFUS N. CHAMBERLAIN.